US012618312B2

(12) United States Patent
Jouenne et al.

(10) Patent No.: US 12,618,312 B2
(45) Date of Patent: May 5, 2026

(54) SYSTEMS AND METHODS FOR PERFORMING A POLYMER FLOOD HAVING A GRADED POLYMER CONCENTRATION

(71) Applicant: TOTALENERGIES E&P RESEARCH & TECHNOLOGY USA, LLC, Houston, TX (US)

(72) Inventors: Stephane Jouenne, Bizanos (FR); Alexandra Klimenko, Pau (FR); Khalid Mateen, Katy, TX (US); Kun Ma, Sugar Land, TX (US); Haishan Luo, Houston, TX (US)

(73) Assignee: TotalEnergies E&P Research & Technology USA, LLC, Houston, TX (US)

( * ) Notice: Subject to any disclaimer, the term of this patent is extended or adjusted under 35 U.S.C. 154(b) by 0 days.

(21) Appl. No.: 18/722,728

(22) PCT Filed: Dec. 21, 2022

(86) PCT No.: PCT/US2022/053708
§ 371 (c)(1),
(2) Date: Jun. 21, 2024

(87) PCT Pub. No.: WO2023/122208
PCT Pub. Date: Jun. 29, 2023

(65) Prior Publication Data
US 2025/0052140 A1 Feb. 13, 2025

Related U.S. Application Data

(60) Provisional application No. 63/292,485, filed on Dec. 22, 2021.

(51) Int. Cl.
*E21B 43/24* (2006.01)
*C09K 8/588* (2006.01)
*C09K 8/592* (2006.01)

(52) U.S. Cl.
CPC .............. *E21B 43/24* (2013.01); *C09K 8/588* (2013.01); *C09K 8/592* (2013.01); *E21B 2200/20* (2020.05)

(58) Field of Classification Search
CPC ..... E21B 43/24; E21B 2200/20; C09K 8/588; C09K 8/592
See application file for complete search history.

(56) References Cited

U.S. PATENT DOCUMENTS 3,603,397 A 9/1971 Peray
4,018,281 A 4/1977 Chang
(Continued)

FOREIGN PATENT DOCUMENTS

WO WO-2020169999 A1 * 8/2020 ............ G01N 11/00

OTHER PUBLICATIONS

International Preliminary Report on Patentability (Chapter I) dated Jun. 20, 2024, for Application No. PCT/US2022/053708.
(Continued)

*Primary Examiner* — Silvana C Runyan
(74) *Attorney, Agent, or Firm* — Conley Rose, P.C.

(57) ABSTRACT

A method for performing a polymer flood of a hydrocarbon-bearing, subterranean reservoir. The method includes injecting a polymer solution from an injection well (32) into the subterranean reservoir to form a polymer slug in the subterranean reservoir, wherein the polymer slug has a leading front and a trailing rear (48), and a graded viscosity profile which decreases in viscosity from the front of the polymer slug to the rear of the polymer slug. The method additionally includes injecting an aqueous solution (50) from the injec-
(Continued)

tion well into the subterranean reservoir following to dis-
place the polymer slug through the subterranean reservoir.

8 Claims, 10 Drawing Sheets

(56)                    References Cited

U.S. PATENT DOCUMENTS

| 10,961,831 | B2 | 3/2021 | Ayirala et al. | |
| 2011/0306252 | A1* | 12/2011 | Chen ..................... | H01R 43/16 |
| | | | | 439/834 |
| 2011/0306525 | A1 | 12/2011 | Lighthelm | |
| 2013/0098620 | A1* | 4/2013 | Chauveteau ............ | E21B 34/06 |
| | | | | 166/305.1 |
| 2013/0168089 | A1* | 7/2013 | Berg ..................... | C09K 8/588 |
| | | | | 166/270.1 |
| 2017/0037700 | A1* | 2/2017 | Jouenne ................... | F15D 1/02 |
| 2020/0018142 | A1* | 1/2020 | Ayirala ................. | C09K 8/594 |

OTHER PUBLICATIONS

International Search Report and Written Opinion dated Apr. 26,
2023, for Application No. PCT/US2022/053708.
First Examination Report for UAE Patent Application No. P2024-
01621 (received by foreign associate Jan. 28, 2026).

* cited by examiner

220

Begin

222

Determine a nonlinear dependence of a viscosity of a polymer solution to a polymer concentration of the polymer solution

224

Simulating the injection of a graded polymer slug into the subterranean reservoir based on the nonlinear dependence of the viscosity of the polymer solution to the polymer concentration of the polymer solution

226

Determining an optimum configuration of a polymer slug based on the simulation

228

Injecting a polymer solution to form a polymer slug in the subterranean reservoir having the optimum configuration

230

Inject an aqueous solution from the injection well into the subterranean reservoir following the injection of the polymer solution to displace the polymer slug through the subterranean reservoir

232

Recover hydrocarbons swept from the subterranean reservoir by the polymer slug using a production well extending into the subterranean reservoir

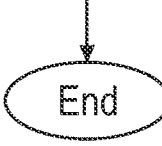

End

FIG. 19

SYSTEMS AND METHODS FOR PERFORMING A POLYMER FLOOD HAVING A GRADED POLYMER CONCENTRATION

CROSS-REFERENCE TO RELATED APPLICATIONS

This application 35 U.S.C. § 371 national stage application of PCT/US2022/053708 filed Dec. 21, 2022, entitled "Systems and Methods for Performing a Polymer Flood Having a Graded Polymer Concentration" which claims benefit of U.S. provisional patent application Ser. No. 63/292,485 filed Dec. 22, 2021, entitled "Systems and Methods for Performing a Polymer Flood Having a Graded Polymer Concentration," both of which are hereby incorporated herein by reference in their entirety for all purposes.

STATEMENT REGARDING FEDERALLY SPONSORED RESEARCH OR DEVELOPMENT

Not applicable.

BACKGROUND

Hydrocarbons may be produced from a porous, subterranean hydrocarbon bearing reservoir by drilling a production well into the subterranean reservoir and flowing hydrocarbons from the reservoir into the production well, and then flowing the hydrocarbons through the production well to the surface. Particularly, following the drilling of the production well into the subterranean reservoir, the pressure within the subterranean reservoir drives hydrocarbons therein into the production well as part of a "primary recovery" process of producing hydrocarbons from the formation. However, typically only a fraction of the hydrocarbons originally present within the subterranean reservoir are produced during the primary recovery phase.

In at least some applications, the primary recovery phase may be followed by an improved oil recovery (IOR) or enhanced oil recovery (EOR) operation in which a fluid is injected into the subterranean reservoir from one or more injection wells (separate and spaced from the production well) to thereby force hydrocarbons remaining within the subterranean reservoir into the production well. For example, as part of a "waterflooding" process, the fluid injected into the subterranean reservoir from the one or more injection wells may comprise an aqueous solution intended to maintain a desired pressure within the subterranean reservoir. In some applications, a polymer may be added to the injection fluid as part of a "polymer flooding" process to control the mobility of the injection fluid and thereby increase the amount of hydrocarbons recovered from the subterranean reservoir as part of the EOR operation. Particularly, compared to waterflooding, the addition of a polymer to the injection fluid as part of a flooding process may increase the sweep efficiency of the reservoir, which refers to the fraction of the subterranean reservoir swept by the injection fluid.

SUMMARY

An embodiment of a method for performing a polymer flood of a hydrocarbon-bearing, subterranean reservoir comprises (a) injecting a polymer solution from an injection well into the subterranean reservoir to form a polymer slug in the subterranean reservoir, wherein the polymer slug has a leading front and a trailing rear, and an S-shaped graded viscosity profile which decreases convexly in viscosity from the front of the polymer slug to an inflection point and concavely in viscosity from the inflection point to the rear of the polymer slug, and (b) injecting an aqueous solution from the injection well into the subterranean reservoir following (a) to displace the polymer slug through the subterranean reservoir. In some embodiments, the viscosity of the polymer slug at the front thereof is greater than the viscosity of the polymer slug at a midpoint between the front and the rear of the polymer slug. In some embodiments, a mobility ratio (M) between the front of the polymer slug and hydrocarbons present in the subterranean reservoir is less than or equal to one. In certain embodiments, the inflection point of the polymer slug is located at a midpoint between the front and the rear of the polymer slug. In certain embodiments, the polymer of the polymer solution comprises an acrylamide-based polymer. In some embodiments, (a) comprises continuously reducing the polymer concentration of the polymer solution over time while injecting the polymer solution from the injection well into the subterranean reservoir. In some embodiments, the method comprises (c) heating a heating fluid by a surface heating system to a temperature that is greater than the temperature of at least some of the hydrocarbons present in the subterranean reservoir, and (d) injecting the heated heating fluid into the subterranean reservoir. In certain embodiments, the nonlinear dependence comprises a nonlinear dependence of a specific viscosity at zero shear rate ($\eta_{sp}$) of the polymer solution on the polymer concentration of the polymer solution.

An embodiment of a method for performing a polymer flood of a hydrocarbon-bearing, subterranean reservoir comprises (a) determining a nonlinear dependence of a viscosity of a polymer solution to a polymer concentration of the polymer solution, (b) simulating the injection of a graded polymer slug into the subterranean reservoir based on the nonlinear dependence of the viscosity of the polymer solution to the polymer concentration of the polymer solution, (c) determining an optimum configuration of a polymer slug based on the simulation, (d) injecting a polymer solution to form a polymer slug in the subterranean reservoir having the optimum configuration, and (e) injecting an aqueous solution from the injection well into the subterranean reservoir following the injection of the polymer solution to displace the polymer slug through the subterranean reservoir. In some embodiments, the polymer slug formed in the subterranean reservoir has an S-shaped graded polymer concentration profile which decreases convexly in polymer concentration from a leading front of the polymer slug to an inflection point, and concavely in polymer concentration from the inflection point to a trailing rear of the polymer slug. In some embodiments, the polymer slug formed in the subterranean reservoir has an S-shaped graded viscosity profile which decreases convexly in viscosity from a leading front of the polymer slug to an inflection point, and concavely in viscosity from the inflection point to a trailing rear of the polymer slug. In certain embodiments, the viscosity of the polymer slug at the front thereof is at least twice the viscosity of the polymer slug at a midpoint between the front and the rear of the polymer slug. In certain embodiments, a mobility ratio (M) between the front of the polymer slug and hydrocarbons present in the subterranean reservoir is less than one. In certain embodiments, (a) comprises (a1) determining an intrinsic viscosity ([$\eta$]) of the polymer solution at a plurality of shear rates to determine a zero-shear viscosity ($\eta_0$) of the polymer solution. In some embodiments, (a) comprises (a2) determining a specific viscosity at zero shear rate ($\eta_{sp}$) of the polymer solution based on the determined intrinsic viscosity ([$\eta$]) of the polymer solution. In some embodiments, the method comprises (f) heating a heating fluid by a surface heating system to a temperature that is greater than the temperature of at least some of the hydrocarbons present in the subterranean reservoir, and (g) injecting the heated heating fluid into the subterranean reservoir. In certain embodiments, (d) comprises reducing the polymer concentration of the polymer solution over time while injecting the polymer solution from the injection well into the subterranean reservoir. In certain embodiments, (b) comprises (b1) developing a geological model of the subterranean reservoir based on geological properties of the reservoir, and (b2) developing a mathematical model of the subterranean reservoir based on the geological model. In some embodiments, the mathematical model comprises a subgrid model configured to model deformations along a leading front of a simulated graded polymer slug. In some embodiments, (c) comprises (c1) determining an optimum initial polymer concentration of the polymer slug based on the simulation, and (c2) determining the optimum configuration of the polymer slug based on the simulation and the optimum initial polymer concentration.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which:

FIG. 19 is a flowchart illustrating an embodiment of a method for performing a polymer flood of a hydrocarbon-bearing, subterranean reservoir in accordance with principles described herein.

DETAILED DESCRIPTION

Figure 1:
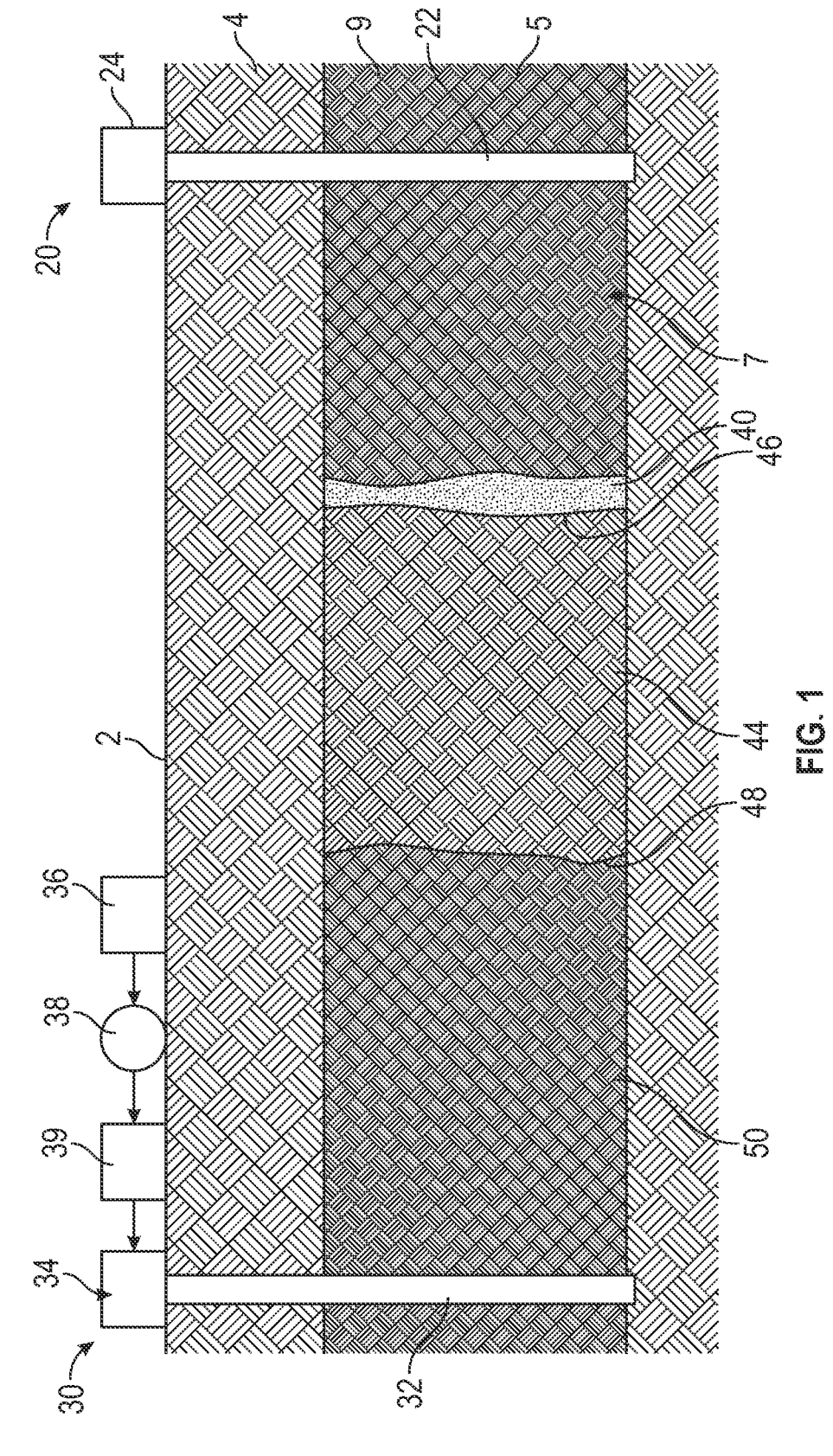
FIG. 1 is a schematic side view of an embodiment of a system for performing an EOR operation in accordance with the principles described herein.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a particular axis (e.g., central axis of a body or a port), while the terms "radial" and "radially" generally mean perpendicular to a particular axis. For instance, an axial distance refers to a distance measured along or parallel to the axis, and a radial distance means a distance measured perpendicular to the axis. As used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

As described above, an EOR/IOR operation may be undertaken in some hydrocarbon production applications to increase the amount of hydrocarbons recovered from a given subterranean reservoir. EOR/IOR operations include water-flooding processes in which an aqueous solution is injected into the subterranean reservoir from one or more injection wells. The injection fluid may comprise an aqueous solution comprising, for example, a brine. EOR operations may also include polymer flooding processes in which a polymer or polymer solution is added to the injection fluid so as to decrease the mobility ratio between the displaced fluid (hydrocarbons present in the subterranean reservoir) and the pushing or displacing fluid (the polymer containing injection fluid) which thereby increases or maximizes a sweep efficiency of the EOR operation. The mobility ratio expressed as the ratio of the mobility of the injection or displacing fluid (an aqueous solution) to the mobility of the displaced fluid (hydrocarbons) for a waterflooding process may be unfavorable for maximizing sweep efficiency. Not intending to be bound by any particular theory, the mobility ratio may be expressed in accordance with Equation (1) below where (M) represents the mobility ratio, $(\lambda_{displacing})$ represents the mobility of the displacing fluid, $(\lambda_{displaced})$ represents the mobility of the displaced fluid, $(K_{r,displacing})$ represents the relative permeability of the displacing fluid, $(K_{r,displaced})$ represents the relative permeability of the displaced fluid, $(\mu_{displacing})$ represents the viscosity of the displacing fluid), and $(\mu_{displaced})$ represents the viscosity of the displaced fluid:

$$M = \frac{\lambda_{displacing}}{\lambda_{displaced}} = \frac{K_{r,displacing}/\mu_{displacing}}{K_{r,displaced}/\mu_{displaced}} \tag{1}$$

As the fluid relative permeabilities (i.e., $K_{r,displacing}$ and $K_{r,displaced}$) are functions of saturation, a globally-constant mobility ratio, $M^0$, is defined with the greatest $K_{r,displacing}$ and $K_{r,displaced}$ achievable in the reservoir. The mobility ratio (M) is typically inversely related to the sweep efficiency of the flooding operation as larger mobility ratios (M) (e.g., mobility ratios $(M^0)$ greater than one) may result in instability and "viscous fingering" whereby relatively slender "fingers" of the displacing fluid punch through the hydrocarbons disposed in the subterranean reservoir, thereby hindering the injection fluid from adequately sweeping the hydrocarbons from the subterranean reservoir. As indicated by Equation (1), a disparity between the viscosity of the displacing fluid $(\mu_{displacing})$ and the viscosity of the displaced fluid $(\mu_{displaced})$ (e.g., a low viscosity aqueous solution versus high viscosity hydrocarbons) may result in an undesirably elevated mobility ratio $(M^0)$ greater than one and a correspondingly low sweep efficiency.

Polymer flooding processes are intended to reduce the mobility ratio (M) between the displacing fluid and the displaced fluid, thereby offering the potential to increase the sweep efficiency of the EOR operation. Particularly, polymer flooding processes usually include pumping a slug of polymer solution from one or more injection wells through the subterranean reservoir followed by an aqueous solution, sometimes referred to as "drive water," that drives the polymer slug and the hydrocarbons trapped in front of the polymer slug through the subterranean reservoir and into the production well. The polymer solution of the polymer slug has a relatively high viscosity and low permeability relative to the aqueous solution, and thus, reduces the mobility ratio (M) between the polymer solution and the hydrocarbons present within the subterranean formation. Stated differently, the polymer solution induces a mobility reduction (sometimes expressed as a mobility reduction factor $(R_m)$) that is associated with the apparent viscosity of the polymer solution flowing through the porous media (e.g., flowing through the subterranean reservoir) and is typically positively correlated with sweep efficiency. It may be understood that the mobility reduction factor for a polymer containing injection fluid may be determined in laboratory experiments in which a pressure drop at a given flow rate through a core sample is compared between water as a reference and the polymer containing injection fluid being studied. Not intending to be bound by any particular theory, this relationship may be expressed in accordance with Equation (2) below where $(\Delta P_{polymer})$ represents the pressure drop that occurs across the core sample as the polymer injection fluid is flowed at the given flow rate, and $(\Delta P_{water})$ represents the pressure drop that occurs across the core sample as the water is flowing at the given flow rate:

$$R_m = \frac{\Delta P_{Polymer}}{\Delta P_{Water}} \tag{2}$$

Generally, the mobility reduction $(R_m)$ results from the higher viscosity of the polymer solution $(\eta_P)$ compared to water $(\eta_w)$ and a permeability reduction $(R_k)$ due to polymer adsorption at the pore wall which creates an additional hydrodynamic resistance. Not intending to be bound by any particular theory, the relationship between mobility reduction $(R_m)$ and permeability reduction $(R_k)$ may be expressed in accordance with Equation (3) below:

$$R_m = \frac{\eta P}{\eta W} \times R_k \tag{3}$$

In the interest of simplicity, this disclosure assumes the polymer does not restrict the size of the pores such that that permeability reduction is equal to one and the mobility reduction (Rm) is equal to the relative viscosity of the polymer solution $(\eta_p/\eta_w)$. However, it may be understood that permeability reduction will typically increase for a given polymer/brine system when permeability of the subterranean reservoir decreases.

The performance of a polymer slug, including the degree of mobility of reduction $(R_m)$ induced by the polymer slug, may be first tested in a laboratory using a core sample analogous to the subterranean reservoir of interest. Particularly, a polymer slug may be injected into a linear core of permeability k initially saturated with water or at residual oil saturation (Sor). In this example, the pore volume or PV $(\phi)$ corresponds to the volume of the core sample accessible to fluid flow. In cases where the core sample is at residual oil saturation, the pore volume is equal to $\phi(1\text{-Sor})$.

It may be understood that the degree of mobility reduction $(R_m)$ induced by the polymer slug depends on several factors including, for example, the concentration of the polymer in the polymer solution. Conventional polymer flooding processes typically utilize a polymer solution having a constant polymer concentration along the length of the polymer slug (e.g., between a front of the polymer slug and a rear of the polymer slug against which the trailing drive water acts). The constant concentration of the polymer solution along the length of the polymer slug typically results in a constant relative viscosity of the polymer solution $(\eta_p/\eta_w)$ and a gradually increasing mobility reduction $(R_m)$ beginning at 1 when polymer injection is initiated (i.e., the pores of the core sample in which polymer will flow are initially full of water) and climaxing at a mobility reduction $(R_m)$ comparable to the constant relative viscosity of the polymer solution.

In application in which the hydrocarbons to be displaced by the polymer flood have a moderate viscosity (e.g., a viscosity less than 50 centipoise (cP)), a polymer slug having a constant polymer concentration may achieve a favorable mobility ratio $(M^0)$ of 1 sufficient to avoid the formation of immiscible fingering along the front of the polymer slug. However, in applications in which the hydrocarbons to be displaced have a high viscosity (e.g., 100 cP or greater), a polymer slug having a constant polymer concentration may be unable to achieve a mobility ratio $(M^0)$ of 1 along the front of the polymer slug, allowing for the formation of immiscible fingering along the front of the polymer slug. Thus, in at least some applications, for a conventional polymer flooding process utilizing a constant polymer concentration, the average mobility reduction $(R_m)$ a (the mobility reduction $(R_m)$ across the entire length of the core sample) is substantially less than the relative viscosity of the polymer solution unless the size of the polymer slug is greater than one pore volume (i.e., greater than the volume of the core sample accessible to fluid flow). Importantly, in real world application in which mobile oil is present (oil saturation is higher than the residual oil recovery) within the subterranean reservoir, an insufficiently low mobility reduction $(R_m)$ at the front of the polymer slug typically results in an undesirably high mobility ratio between the flowing polymer solution and the oil, resulting in fingering through the reservoir until it reaches the production well, thereby reducing the sweep efficiency of the polymer flooding process.

Moreover, even in instances where the constant polymer concentration slug is able to achieve a mobility ratio $(M^0)$ of one, distortions may form along the front of the polymer slug which reduces the sweep efficiency and overall hydrocarbon recovery provided by the polymer slug. For example, even at a mobility ratio $(M^0)$ of one, heterogeneity and dispersion may occur along the front of the polymer slug due to the presence of high permeability and low permeability streaks within the subterranean reservoir, preventing the front of the polymer slug from advancing in a uniform, piston-like manner against the hydrocarbons.

While the concentration of the polymer within the polymer solution may be increased to minimize the degree of fingering and/or other deformations along the front of the polymer slug, the increased amount of polymer utilized in the polymer flooding process may increase the overall cost associated with performing the EOR operation. Moreover, too high of a polymer concentration in the polymer solution may result in an undesirably high differential pressure across the polymer slug which may lead to an injectivity decrease and/or undesirable injectivity issues. In other words, a highly-concentrated polymer slug may be difficult to "push out" of the subterranean reservoir by surface pumping equipment such that the flow rate of the polymer solution into the subterranean reservoir decreases to an undesirably low rate that delays the recovery of hydrocarbons and increases the amount of time required for performing the polymer flooding process.

Accordingly, embodiments disclosed herein include systems and methods for performing polymer floods having graded polymer concentrations. The graded polymer concentration of the polymer plug is determined from nonlinear dependence of the viscosity of a polymer solution comprising the polymer slug and a polymer concentration of the polymer solution. For example, a graded polymer slug may extend through a subterranean reservoir between a front (pushing against hydrocarbons disposed within the reservoir) and a rear (pushed by the drive water). The polymer concentration of the polymer solution associated with the front of the graded polymer slug is greater than an average polymer concentration of the polymer solution over an entire volume of the graded polymer slug. In this manner, a mobility ratio (M) along the front of the graded polymer slug may be achieved that is less than one, thereby minimizing the formation of deformations along the front including heterogeneity and dispersions. The reduced mobility ratio (M) may maximize the sweep efficiency of the polymer slug to maximize hydrocarbon recovery while minimizing the total mass of polymer utilized to recover a given amount of hydrocarbons from the subterranean reservoir.

Additionally, the polymer concentration of the polymer solution associated with the rear of the graded polymer slug is less than the average polymer concentration of the polymer solution. In other words, the polymer concentration of the polymer solution may be reduced (gradually and/or in a step-wise manner) moving from the front of the graded polymer slug to the rear of the graded polymer slug such that the polymer concentration at the front of the graded polymer slug corresponds to a maximum polymer concentration of the polymer solution while the polymer concentration at the rear of the graded polymer slug corresponds to a minimum polymer concentration of the polymer solution.

By configuring the graded polymer slug based on the nonlinear dependence of viscosity of the polymer solution to the polymer concentration, the mobility reduction $(R_m)$ induced by the graded polymer slug may be maximized such that the front of the graded polymer slug provides a piston-like displacement of hydrocarbons of the subterranean reservoir, thereby offering the potential to mitigate and/or eliminate the undesirable formation of immiscible fingering between the polymer slug and the hydrocarbons present in the reservoir even when the hydrocarbons have a high viscosity. Additionally, the elimination or at least mitigation of viscous fingering between the polymer slug and the hydrocarbons may be accomplished without increasing either an average polymer concentration of the polymer slug or the overall mass or amount of polymers in the polymer slug (relative to a constant polymer slug). In other words, sweep efficiency may be maximized via use of the graded polymer slug based on the nonlinear dependence of viscosity to polymer concentration without the drawbacks typically associated with polymer slugs having excessively high average polymer concentrations such as, for example, an undesirably high pressure differential across the polymer slug.

Additionally, embodiments disclosed herein include heating an injection fluid prior to pumping the injection fluid into the subterranean reservoir. Specifically, in some applications, the hydrocarbons to be captured from the subterranean reservoir may be at a very high viscosity (e.g., a viscosity in excess of 100 cP, for example), substantially increasing the difficulty in achieving a favorable mobility ratio (M) along the front of the graded polymer slug. By heating the injection fluid (e.g., an aqueous solution injected prior to the polymer solution) to a temperature greater than the temperature of the hydrocarbons present in the subterranean reservoir, the injection fluid may be used to convey and transfer heat to the hydrocarbons and thereby increase the temperature of the hydrocarbons. The viscosity of the hydrocarbons present in the subterranean reservoir may be decreased greatly by increasing the temperature of the hydrocarbons through heat transfer with the injection fluids, thereby reducing the mobility ratio (M) along the front of the polymer slug.

Figure 2:
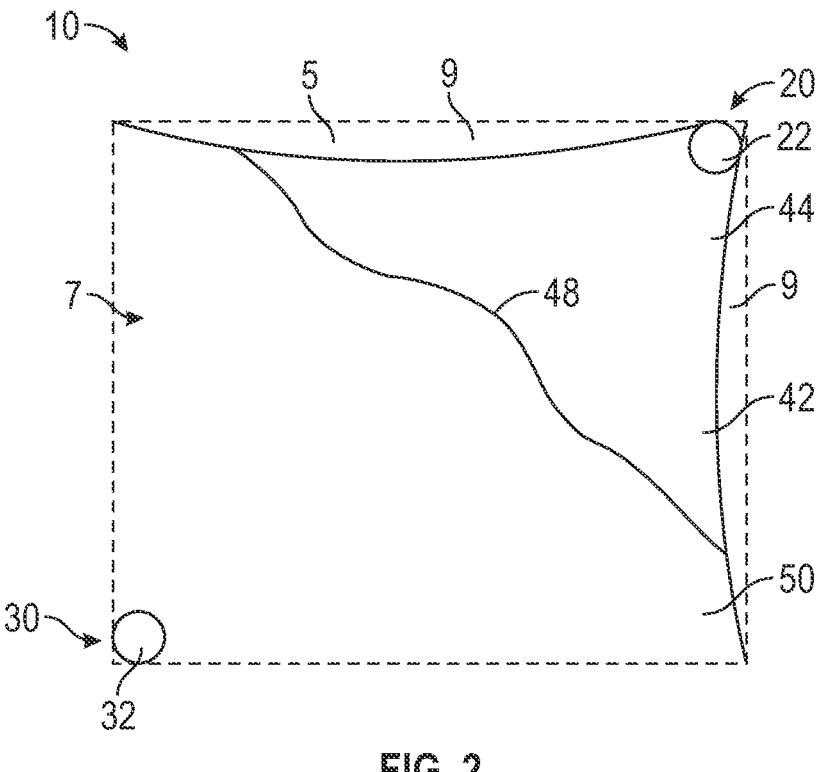
FIG. 2 is a schematic plan view of the EOR system of FIG. 1.

Referring now to FIGS. 1 and 2, an embodiment of a system 10 for performing an EOR operation is shown. Accordingly, system 10 may also be referred to herein as EOR system 10. Particularly, EOR system 10 may be utilized to perform a polymer flood to maximize the recovery of hydrocarbons from a hydrocarbon-bearing subterranean reservoir 5 having a pore volume (PV) (indicated generally by arrow 7 in FIGS. 1 and 2). In this exemplary embodiment, EOR system 10 generally includes a production system 20 and an injection system 30 that work together to produce hydrocarbons from reservoir 5. The PV of subterranean reservoir 5 corresponds to the portion of reservoir 5 accessible to fluid flow from injection system 30.

The production system 20 of EOR system 10 is configured to recover hydrocarbons 9 from the subterranean reservoir 5 and may be utilized as part of a primary recover process in addition, and prior to, an EOR process. In this exemplary embodiment, production system 20 includes a production well 22 that extends from the surface 2 through a subterranean earthen formation 4 and into the subterranean reservoir 5 positioned within the earthen formation 4. Production system 20 also includes a production surface assembly 24 associated with the production well 22 and which includes equipment for processing the fluids received from production well 22. For example, production surface assembly 24 may comprise a production facility for processing hydrocarbons 9 recovered by subterranean reservoir 5 as well as other fluids including fluids injected into subterranean reservoir 5 by injection system 30 as will be described in more detail below. In some embodiments, equipment of production surface assembly 24 may return some of the injection fluids received by the production system 20 to the injection system 30. It is to be understood that production surface assembly 24 may include equipment in addition to that shown in FIGS. 1 and 2. Although production system 20 is shown in FIGS. 1 and 2 as including a single production well 22, in other embodiments, production system 20 may include a plurality of separate production wells 22 associated with one or more production surface assemblies 24.

Referring still to FIGS. 1 and 2, injection system 30 includes an injection well 32 that extends from the surface 2 through the subterranean earthen formation 4 and into the subterranean reservoir 5 positioned within the earthen formation 4. Injection system 30 also includes an injection surface assembly 34 associated with the injection well 32. In this exemplary embodiment, injection surface assembly 34 includes a displacing or injection fluid source 36 and an injection pump 38 configured to pump injection fluids from fluid source 36, through the injection well 32 and into the subterranean reservoir 5. The pressure of the fluids injected into injection wellbore 32 by injection pump 38 may vary widely depending on the given application. In this exemplary embodiment, injection system 30 additionally includes a heating system 39 downstream from the injection pump 38. In this configuration, injection fluids are heated by heating system 39 after the injection fluids are pressurized by injection pump 38. Heating system 39 may comprise one or more heat exchangers in which the injection fluids receive heat from one or more fluids. Heating system 39 may also comprise a heater such as a furnace and the like. In other embodiments, injection system 30 may not include heating system 39. It may also be understood that injection surface assembly 34 may include equipment in addition to that shown in FIGS. 1 and 2. Additionally, although only a single injection well 32 is shown in FIGS. 1, 2, injection system 30 may comprise a plurality of injection wells 32 and associated injection surface assemblies 34.

Injection system 30 is generally configured to inject fluids (i.e., injection fluids) into subterranean reservoir 5 to thereby increase the recovery of hydrocarbons 9 from subterranean reservoir 5. In this exemplary embodiment, injection system 30 is configured to initially pump a surfactant 40 from injection surface assembly 34 down the injection well 32 and into subterranean reservoir 5. The surfactant 40 may alter the wettability of the subterranean reservoir 5 to thereby improve the recovery of hydrocarbons 9 from reservoir 5.

Following the injection of the surfactant 40, injection system 30 is configured to pump a polymer solution 42 via injection pump 38 from the injection surface assembly 34 through the injection well 32 and into the subterranean reservoir 5. The polymer solution 42 forms a polymer slug or core 44 within the subterranean reservoir 5 having a front 46 and a rear 48 spaced from the front 46 such that the front 46 is positioned between the rear 48 and production well 22. Following the injection of the polymer solution 42, injection system 30 is configured to inject an aqueous solution 50 from the injection surface assembly 34 through the injection well 32 and into the subterranean reservoir 5. Aqueous solution 50 comprises drive water in some embodiments and thus may also be referred to herein as drive water 50. The aqueous solution 50 pushes and drives the polymer slug 44 through the subterranean reservoir 5 and into the production well 22 along with at least a portion of the hydrocarbons 9 in the reservoir 5 between the front 46 of the polymer slug 44 and the production well 22.

Additionally, in this exemplary embodiment, prior to pumping the polymer solution 42 into the injection well 32, a heating fluid (e.g., water or an aqueous solution) is injected into the subterranean reservoir 5. Particularly, the heating fluid is heated by heating system 39 following pressurization via injection pump 38 but prior to flowing into injection well 32. Particularly, the heating fluid is heated (e.g., via heat exchange with another fluid or via a heater such as a furnace) to a temperature that is greater than a temperature of the hydrocarbons 9 in the reservoir 5. In some embodiments, the heating fluid is heated to a temperature that is slightly less than a boiling or vaporization temperature of the water present in polymer solution 42 in order to prevent the formation of steam within injection well 32 and/or reservoir 5. Given that boiling temperature is inversely correlated with pressure, the temperature of the heating fluid may be maximized by heating the heating fluid after it has been pressurized by injection pump 38. The polymer solution 42 may then be injected into the subterranean reservoir 5 following the injection of the heating fluid into reservoir 5. It may be understood that heating system 39 may not be utilized in every application. Particularly, heating system 39 may be utilized in applications in which hydrocarbons 9 are at a high viscosity such as, for example, a viscosity exceeding 100 cP.

The polymer solution 42 that forms the polymer slug 44 comprises one or more polymers. Particularly, polymer solution 42 may include an acrylamide-based polymer in an aqueous solvent. For example, the polymer of polymer solution 42 may be derived from one or more monomers selected from acrylamide, sodium acrylate, N-vinyl pyrrolidone, 2-acrylamide-2-methylpropane sulfonate, or combinations thereof. In some embodiments, the polymer is selected from the homopolymer of 2-acrylamide-2-methylpropane sulfonate; copolymers of acrylamide and sodium acrylate; copolymers of acrylamide and 2-acrylamide-2-methylpropane sulfonate; copolymers of acrylamide and N-vinyl pyrrolidone; terpolymers of acrylamide, sodium acrylate and N-vinyl pyrrolidone; terpolymers of acrylamide, sodium acrylate and 2-acrylamide-2-methylpropane sulfonate; or combinations thereof. In other embodiments, the polymer comprises a polyacrylamide (PAM) polymer, a partially hydrolyzed polyacrylamide (HPAM), polysaccharides such as Xanthan gum, another polymer, or combinations thereof.

In some embodiments, only a single acrylamide-based polymer is present in polymer solution 42 while in other embodiments a plurality of different acrylamide-based polymers are present in the polymer solution 42. The polymer concentration of polymer solution 42 may vary widely depending on the given application. For example, the polymer concentration of polymer solution 42 may range from about 10,000 parts per million (ppm) by weight to less than about 100 ppm by weight. Additionally, the aqueous solvent in which the polymer of polymer solution 42 is dissolved comprises water, which may be derived from a variety of sources (e.g., produced water, fresh water, sea water, etc.). The salinity of the aqueous solvent may vary widely depending on the given application.

As shown particularly in FIG. 2, the polymer slug 44 sweeps across the PV 7 of subterranean reservoir 5 with the front 46 of polymer slug 44 providing piston-like displacement of hydrocarbons 9 into the production well 22 without viscous fingering of the polymer slug 44 and/or aqueous solution 50 into the hydrocarbons 9 located within subterranean reservoir 5. Particularly, a mobility ratio (M°) of less than one may be achieved along the front 46 of polymer slug 44, thereby minimizing deformations such as heterogeneity and dispersions along front 46 and instead achieving a piston-like displacement of the hydrocarbons 9 through the reservoir 5.

Unlike conventional polymer flooding processes, viscous fingering of the polymer slug 44 through the hydrocarbons 9 is avoided in this exemplary embodiment by varying the polymer mass concentration of polymer solution 42 along the length of polymer slug 44 between the front 46 and rear 48 of the polymer slug 44. Thus, the polymer mass concentration of polymer solution 42 does not remain constant and instead varies over time as the polymer solution 42 is pumped into the injection well 32 by the injection pump 38. Particularly, in this exemplary embodiment, the polymer mass concentration of polymer solution 42 decreases over time as the polymer solution 42 is pumped into the injection well 32 by the injection pump 38. Thus, the polymer solution 42 forming and defining the front 46 of polymer slug 44 has the greatest polymer mass concentration within the polymer slug 44 while the polymer solution 42 forming and defining the rear 48 of polymer slug 44 has the lowest polymer mass concentration within the polymer slug 44.

In embodiments in which heating system 39 is utilized to heat the heating fluid prior to injection into subterranean reservoir 5, heat is transferred from the heating fluid to the hydrocarbons 9, thereby heating and increasing the temperature of the hydrocarbons 9. In some applications, by avoiding the formation of immiscible fingering along as well as minimizing other deformations (e.g., heterogeneity, dispersions, etc.) along the front 46 of polymer slug 44, the hydrocarbons 9 may be heated uniformly along the front 46 of polymer slug 44. It may be understood that the inability of avoiding immiscible fingering (e.g., when only mobility ratio (M°) greater than one is achieved) heating of injection fluids prior to their injection into the reservoir 5 may result in non-uniform heating of the hydrocarbons 9 resulting in a reduction in the sweep efficiency and hydrocarbon recovery from the polymer flooding process.

Figure 3:
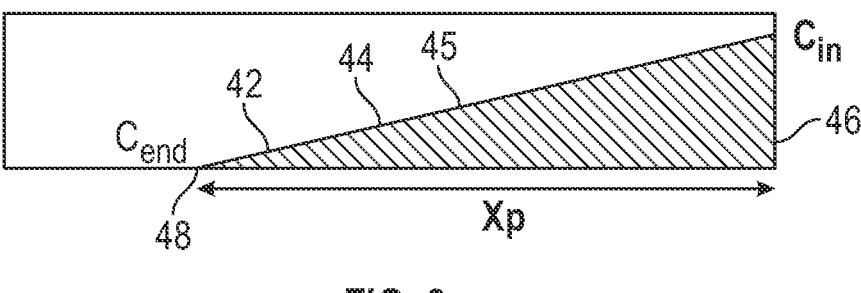
FIG. 3 is a graph of the concentration of a polymer in an exemplary polymer solution.

The reduction in polymer concentration along the length of the polymer slug 44 is configured to produce a mobility ratio (M°) less than one along the front 46 of polymer slug 44 to thereby eliminate immiscible fingering while also minimizing other deformations such as heterogeneity and dispersion along the front 46, of the polymer slug 44. In some embodiments, the polymer mass concentration of polymer solution 42 may decrease continuously and gradually over time. For example, referring briefly to FIG. 3, an exemplary polymer slug 44 of polymer solution 42 is shown. Polymer slug 44 has a leading front 46, a trailing rear 48, and a length $(X_p)$ measured between the front 46 and rear 48. In addition, polymer slug 44 has an initial polymer mass concentration $(C_{in})$ of polymer solution 42 at the front 46 of polymer slug 44 and a final or end polymer mass concentration $(C_{end})$ of polymer solution 42 located at the rear 48 of polymer slug 44. In this embodiment, the initial polymer mass concentration $(C_{in})$ of polymer solution 42 at the front 46 defines a maximum polymer mass concentration of the polymer solution 42 while the end polymer mass concentration $(C_{end})$ of polymer solution 42 at the rear 48 of polymer slug 44 defines a minimum polymer mass concentration of the polymer solution 42. Further, the polymer mass concentration (C) of polymer solution 42 decreases gradually according to a linear slope 45 moving from the initial polymer mass concentration $(C_{in})$ at the front 46 to the end polymer mass concentration $(C_{end})$ at the rear 48.

Relative to a polymer slug comprising a polymer solution having a constant polymer mass concentration, the declining or graded mass concentration of polymer solution 42 minimizes and/or eliminates undesirably viscous fingering without needing to increase the total mass of polymer injected into the subterranean reservoir. In other words, at a given total polymer mass, the polymer slug 44 comprising a graded polymer solution 42 that declines in polymer mass concentration over time provides for a greater sweep efficiency (and hence greater overall recovery of hydrocarbons 9) relative to a polymer slug comprising a polymer solution having a constant polymer mass concentration overtime.

Figure 4:
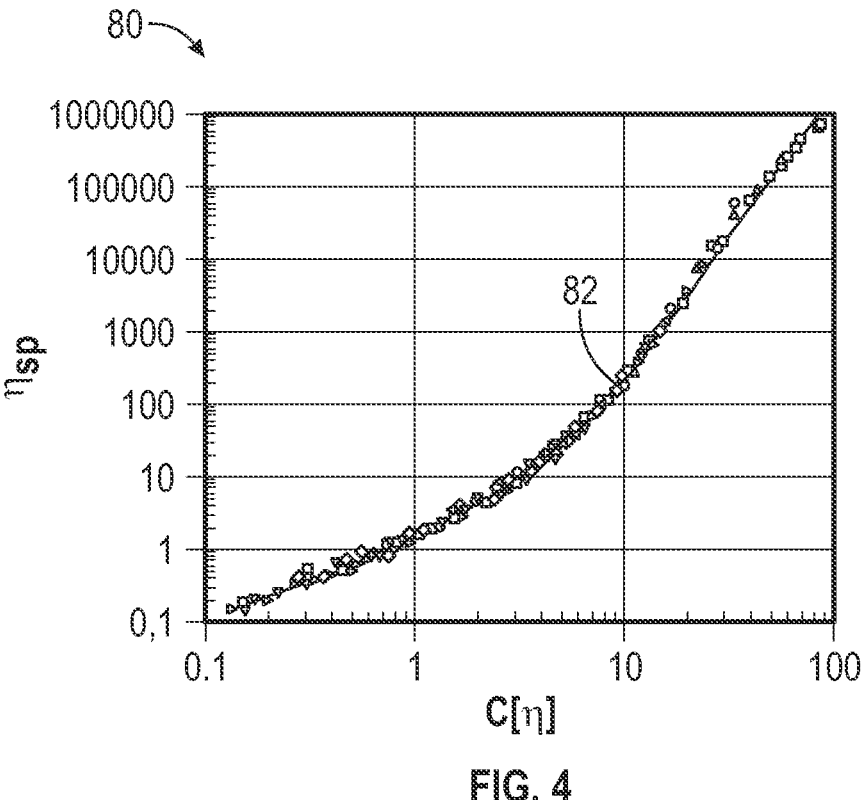
FIG. 4 is a graph illustrating an exemplary specific viscosity at zero shear rate as a function of the product of polymer mass concentration and intrinsic viscosity.

The graded polymer mass concentration of the polymer solution 42 forming polymer slug 44 is based on a nonlinear dependence between the viscosity of polymer solution 42 and the polymer mass concentration of polymer solution 42. Referring now to FIG. 4, a graph 80 illustrates an exemplary specific viscosity 82 at zero shear rate (dimensionless specific viscosity $(\eta_{sp})$ indicated by the Y-axis of graph 80) as a function of the product of polymer mass concentration and the intrinsic viscosity (the dimensionless product $(C_{[\eta]})$ of the polymer mass concentration and the intrinsic viscosity is indicated along the X-axis of graph 80). The phrase "zero shear rate" refers to the dynamic viscosity of the polymer solution at low shear rates at which the polymer solution exhibits Newtonian behavior. Not intending to be bound by any particular theory, the specific viscosity at zero shear rate of the polymer solution (indicated by numeral 82 in FIG. 4) at a given temperature may be expressed in accordance with Equation (4) below where $(\eta_{sp})$ represents the specific viscosity at zero shear rate, $(\eta_P)$ represents the zero-shear rate viscosity, and $(\eta_w)$ represents the viscosity of the aqueous solution devoid of the polymer:

$$\eta_{sp} = \frac{(\eta_P - \eta_W)}{\eta_W} \qquad (4)$$

Not intending to be bound by any particular theory, the specific viscosity $(\eta_{sp})$ of a polymer solution may be defined as a mathematical fit expressed in accordance with Equation (5) below where (C) represents the polymer mass concentration of the polymer solution, and $([\eta])$ represents the intrinsic viscosity of the polymer solution:

$$\eta_{sp} = C \cdot [\eta] + 0.56(C \cdot [\eta])^{2.17} + 0.0026(C \cdot [\eta])^{4.72} \qquad (5)$$

The intrinsic viscosity (expressible in units of liters per gram (L/g)) refers to the limit of the specific viscosity at zero shear rate divided by the mass concentration of the polymer in the polymer solution when the mass concentration approaches zero. The intrinsic viscosity of the polymer indicates the effective volume of which one gram (g) of polymer in the polymer solution counters the flow of liquid and is contingent on the interactions between the polymer and solvent of the solution, and thus, is characteristic of a given polymer combined with a particular aqueous solution.

The mathematical fit expressed by Equation (5) above may be determined by initially determining the intrinsic viscosity $([\eta])$ of a given polymer solution (e.g., polymer solution 42) by measuring the dynamic viscosity of the polymer solution (e.g., via a rotational viscometer or other instrument) at one or more polymer concentrations at the given temperature and at various shear rates to thereby determine the zero-shear viscosity $(\eta_0)$ at the one or more polymer concentrations and given temperature. The specific viscosity at zero shear rate $(\eta_{sp})$ of the polymer solution at the given temperature may then be determined based on the determined zero-shear viscosity $(\eta_0)$ and the relationship described by Equation (4) above. Not intending to be bound by any particular theory, the relative viscosity at zero-shear rate $(\eta_P/\eta_W)$ of a polymer solution may be defined as a mathematical fit expressed in accordance with Equation (6) below where (C) represents the polymer mass concentration of the polymer solution, and $([\eta])$ represents the intrinsic viscosity of the polymer solution, and $(\eta_W)$ represents the viscosity of water:

$$\eta_P/\eta_W = \left[ 1 + (C \cdot [\eta]) + 0.56(C \cdot [\eta])^{2.17} + 0.0026(C \cdot [\eta])^{4.72} \right] \qquad (6)$$

Given that the values for $(\eta_{sp})$ and $(\eta_P)$ are determined from mathematical fits expressed by Equations (5) and (6) above, the values may deviate by some percentage small (e.g., a percentage less than 20%). However, it may be understood that Equations (5) and (6) as well as the graph 80 of FIG. 4 indicate that the viscosity of a polymer solution varies nonlinearly with polymer concentration. Particularly, viscosity of the polymer solution increases nonlinearly with increasing polymer concentration such that a given increase in polymer concentration may result in a relatively larger increase in the viscosity of the polymer solution.

Figure 5:
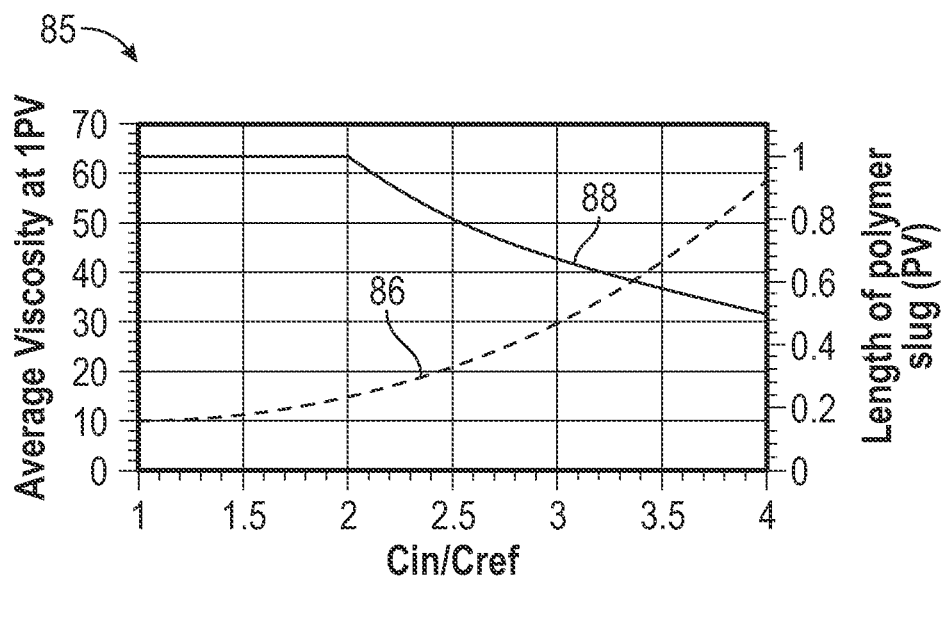
FIG. 5 is a graph illustrating the average viscosity of an exemplary polymer solution as a function of initial polymer concentration divided by a reference polymer concentration.

The nonlinear relationship between polymer solution viscosity and polymer concentration may be utilized to enhance or maximize an average viscosity of the polymer solution comprising a polymer slug and so enhance or maximize the resulting average mobility reduction. For example, referring now to FIG. 5, a graph 85 indicates average viscosity of a polymer solution (indicated by numeral 86 in graph 85 in units of centipoise (cP)) and a length of the polymer slug (indicated by numeral 88 in graph 85) as a function of an initial polymer concentration $(C_{in})$ divided by a reference or average concentration $(C_{ref})$ across a 1 PV volume (equal to 1,500 ppm in this example). As indicated by graph 85, the average viscosity 86 of the polymer solution increases nonlinearly such that the slope of the average viscosity 86 increases as the initial concentration $(C_{in}/C_{ref})$ increases. For example, the increase in average viscosity 86 that occurs in response to an increase in $(C_{in}/C_{ref})$ from 3 to 3.5 is greater than the increase in average viscosity 86 that occurs in response to an increase in $(C_{in}/C_{ref})$ from 2 to 2.5. Graph 85 thereby illustrates that the nonlinear relationship between polymer solution viscosity and polymer concentration (i.e., the increasing slope of polymer solution viscosity as a function of polymer concentration) may be leveraged to achieve a greater average viscosity 86 across the entirety (e.g., 1 PV) by maximizing the initial polymer concentration $(C_{in})$ of the polymer solution at the front of the polymer slug. For this and other reasons, the change in polymer concentration of polymer solution 42 along the length of the polymer slug 44 shown in FIGS. 1 and 2 is based on the nonlinear relationship between polymer solution viscosity and polymer concentration expressed in Equations (5) and (6) above.

Graph 85 also illustrates that an increase in $(C_{in}/C_{ref})$ reduces the length 88 of the polymer slug at least for values of $(C_{in}/C_{ref})$ greater than two. In at least some applications, it may be advantageous to decrease the length 88 of the polymer slug so as to correspondingly decrease the time required for displacing the polymer slug through the subterranean reservoir (e.g., the time required for displacing slug 44 through subterranean reservoir 5), which can take months or even several years.

Figure 6:
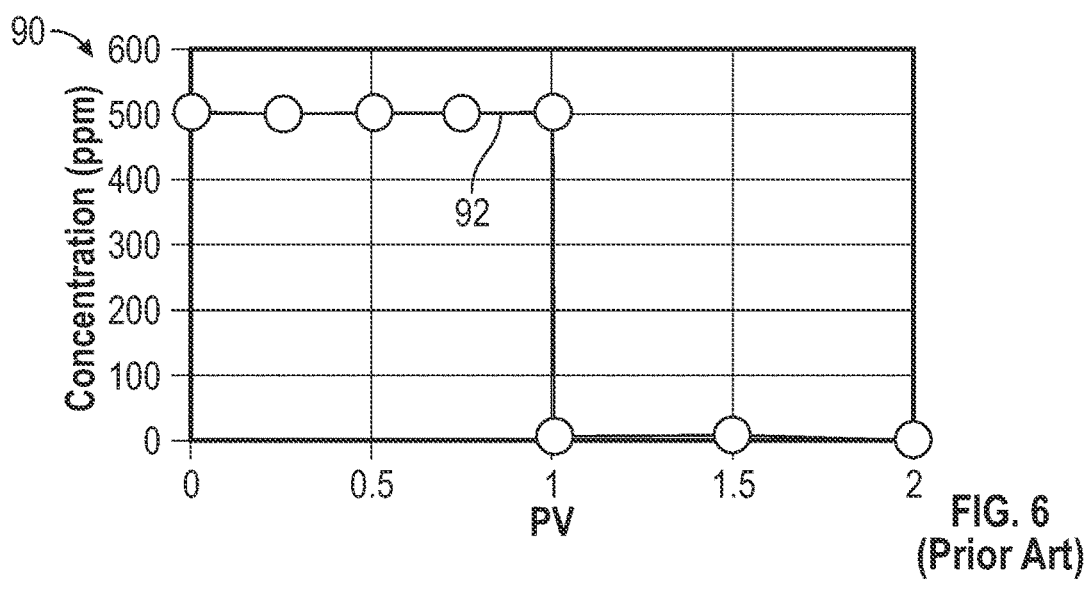
FIG. 6 is a graph illustrating the polymer concentration as a function of fractional volume of an exemplary constant polymer slug.
Figure 7:
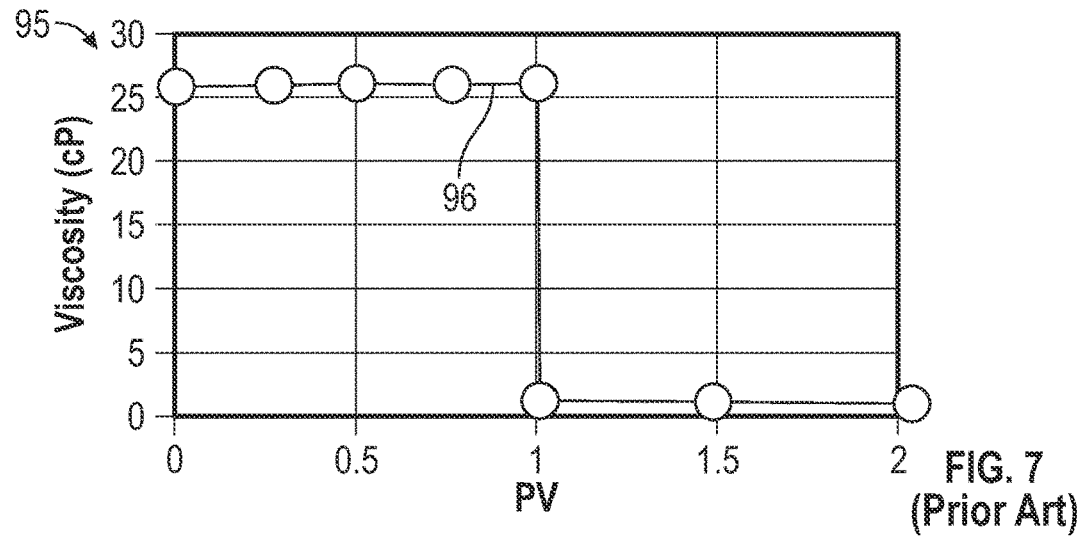
FIG. 7 is a graph illustrating the viscosity as a function of the fractional volume of the constant polymer slug of FIG. 6.

Additionally, the nonlinear relationship between polymer solution viscosity and polymer concentration may be utilized to provide a graded polymer slug (e.g., graded polymer slug 44 shown in FIGS. 1 and 2) inducing a greater mobility reduction than a constant polymer slug having the same total polymer mass injected as the graded polymer slug. As an example, and referring now to FIGS. 6-8, graphs 90, 95, and 100 are shown, respectively, of a conventional polymer slug having a constant polymer concentration (indicated by numeral 92 in graph 90), and thus, also having a constant viscosity (indicated by numeral 96 of graph 95 in units of cP). Particularly, in this example, constant polymer slug comprises a polymer solution in which $(C_{in}/C_{ref})$ is equal to one. The size or volume of the constant polymer slug is expressed as fractions of the PV of a given subterranean reservoir, and thus, 0 PV indicates the front of the constant polymer slug while 1 PV indicates the rear of the constant polymer slug. It may be noted that in this example the constant polymer slug is followed by drive water also equaling 1 PV in volume.

Figure 8:
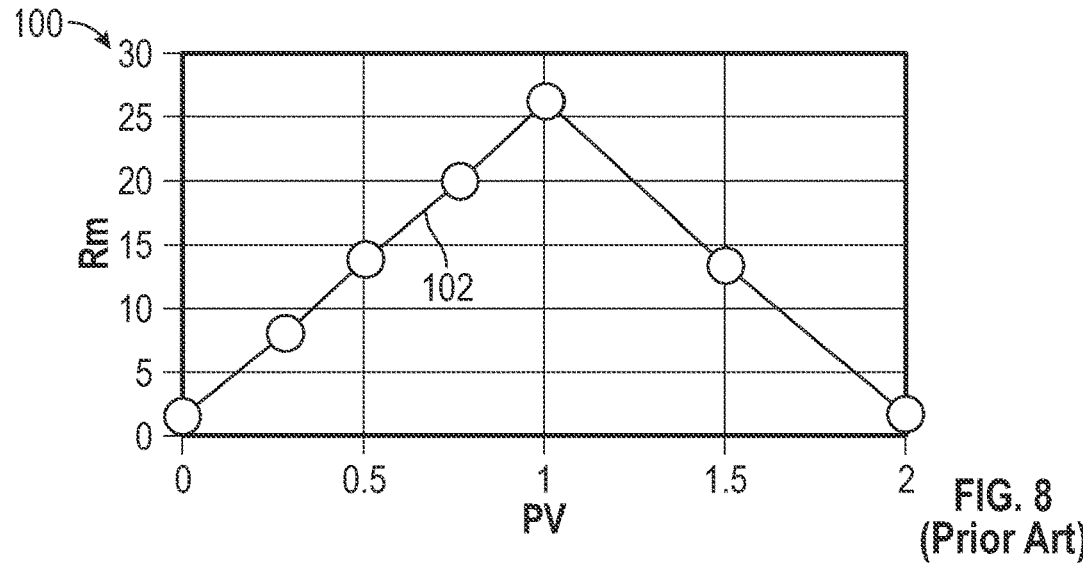
FIG. 8 is a graph illustrating the mobility reduction as a function of the fractional volume of the constant polymer slug of FIG. 6.

Graph 100 of FIG. 8 illustrates a mobility reduction ($R_m$) 102 induced by the constant polymer slug injected into an exemplary core sample. For this example, a polymer brine system at a temperature T for which the intrinsic viscosity is equal to 3 L/g was considered. It may be understood that other examples could be based on another polymer concentration of the reference constant concentration slug and/or other intrinsic viscosity. Particularly, the average mobility reduction (Rm) 102 (it is a calculation on the core length) of the constant polymer slug rises linearly from a value near zero to a maximum value (approximately 23 in this example) that is equivalent to the constant solution viscosity 96 (shown in FIG. 7) throughout the polymer slug. If the mobility reduction at the front of the polymer slug is too low, it can lead to the formation of viscous fingering whereby portions of the front of the constant polymer slug may pierce or finger into the hydrocarbons located within the subterranean reservoir, thereby reducing the sweep efficiency and overall recovery of hydrocarbons from the reservoir.

Figures 9, 10, 11:
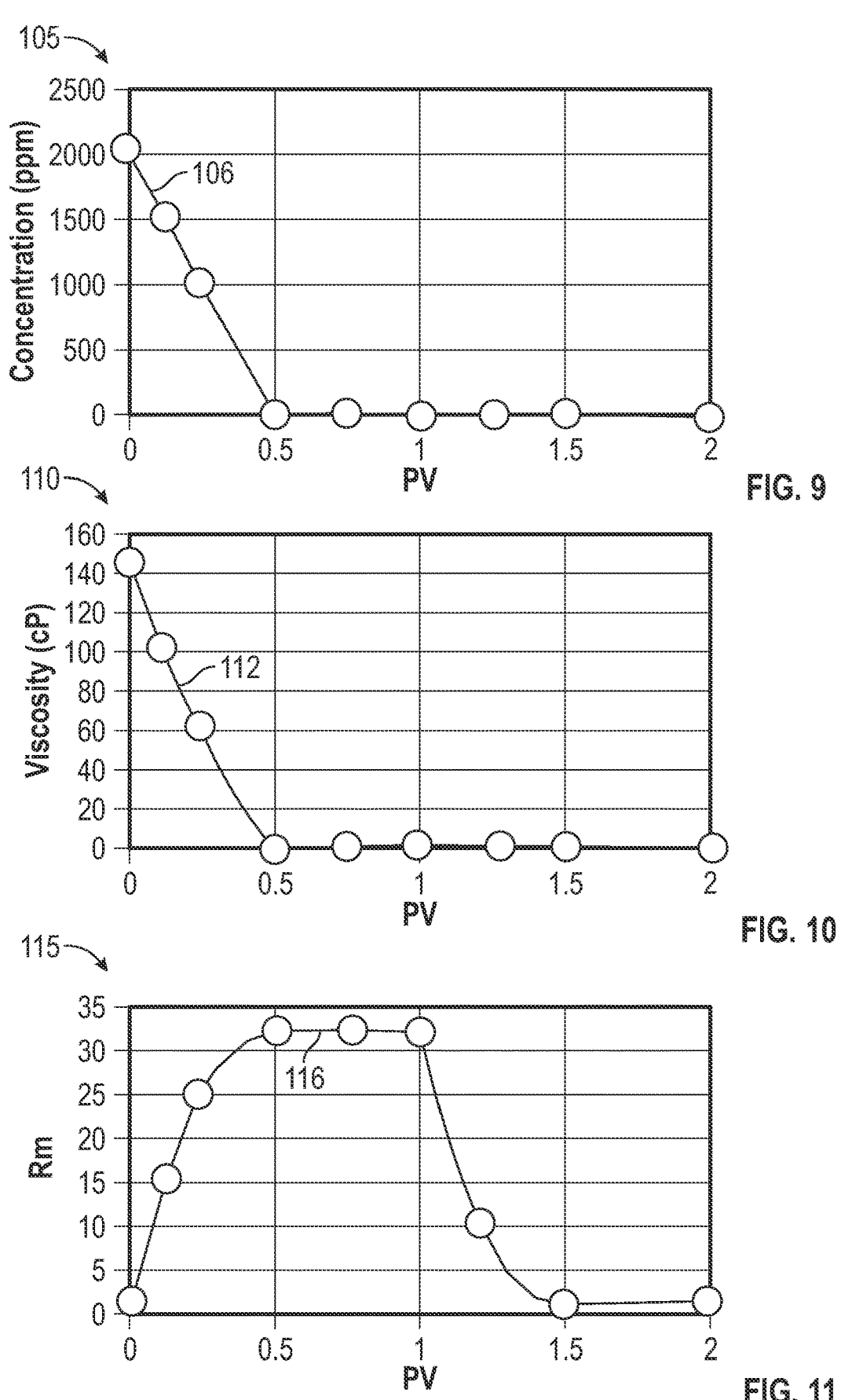
FIG. 9 is a graph illustrating the polymer concentration as a function of fractional volume of an exemplary graded polymer slug.
FIG. 10 is a graph illustrating the viscosity as a function of the fractional volume of the constant graded slug of FIG. 9.
FIG. 11 is a graph illustrating the mobility reduction as a function of the fractional volume of the graded polymer slug of FIG. 9.

Referring now to FIGS. 9-11, graphs 105, 110, and 115 are shown, respectively, of an exemplary polymer slug having a graded polymer concentration (indicated by numeral 106 in graph 105) that decreases linearly from a maximum initial concentration ($C_{in}$=4 $C_{ref}$=6000 ppm in this example) at the front of the graded polymer slug to a minimum end concentration ($C_{end}$) at the rear of the graded polymer slug. The viscosity of the polymer slug (indicated by numeral 112 in graph 110) thus decreases nonlinearly from a maximum viscosity at the front of the polymer slug to a minimum viscosity at the rear of the polymer slug. In this example, the initial polymer concentration ($C_{in}$) of the graded polymer slug is 6000 ppm and the reference polymer concentration ($C_{ref}$) (e.g., the average concentration across the 1 PV volume of the polymer slug) is equal to 1,500 ppm providing a ($C_{in}/C_{ref}$) equal to 4.

As shown particularly by graph 115, the mobility reduction ($R_m$) (indicated by numeral 116 in graph 115) induced by the graded polymer slug increases much more rapidly relative to the mobility reduction (Rm) 102 of graph 100 induced by the constant polymer slug. For example, at 0.5 PV the graded polymer slug induces a mobility reduction ($R_m$) greater than 253 while at 0.5 PV the constant polymer slug has induced a mobility reduction ($R_m$) of 23—more than 10 times less than the mobility reduction ($R_m$) 116 induced by the graded polymer slug. Moreover, at 0.25 PV the graded polymer slug induces a mobility reduction ($R_m$) greater than 20 while at 0.5 PV the constant polymer slug has induced a mobility reduction ($R_m$) less than 10—again less than half the mobility reduction ($R_m$) 116 induced by the graded polymer slug.

The substantially more rapid increase in mobility reduction ($R_m$) 116 induced by the graded polymer slug relative to that induced by the constant polymer slug provides a more enhanced sweep of the hydrocarbons near the injection well while also providing a better blocking effect in-depth. Additionally, the faster sweep efficiency of the graded polymer slug results in boil bank formation acceleration, enhances cross-flow due to increased pressure gradients across the front of the graded polymer slug, and a decrease in the formation of viscous fingering at the interface between the graded polymer slug and the hydrocarbons.

The advantages described above may be accrued particularly by configuring the graded polymer slug based on the nonlinear relationship between polymer solution viscosity and polymer concentration illustrated by Equations (5) and (6) above. For example, referring again to FIG. 5, the slope of the average viscosity 86 of the polymer solution begins to elevate substantially at ($C_{in}/C_{ref}$) greater than 1.5 illustrating that the most pronounced effects of varying polymer concentration (e.g., rapidly increasing mobility reduction, reductions in viscous fingering, etc.) may be achieved at ($C_{in}/C_{ref}$) greater than 1.5. However, too great of a ($C_{in}/C_{ref}$) (e.g., ($C_{in}/C_{ref}$) greater than 3.5) may result in the formation of viscous fingering between the drive water and graded polymer slug (e.g., the formation of fingers of drive water punching through the rear of the graded polymer slug and into the hydrocarbons there ahead) due to the rapid decrease in mobility reduction that occurs at the rear of the graded polymer slug at excessively great ($C_{in}/C_{ref}$). In sum, configuring the graded polymer slug based on the nonlinear relationship between polymer solution viscosity and polymer concentration illustrated by Equations (5) and (6) provides a graded polymer slug that offers the potential to harness the advantages associated with nonlinearly increasing viscosity of the polymer solution in response to increasing polymer concentration while avoiding potential issues associated with too gradated of a polymer slug.

Referring again to FIGS. 1 and 2, in some embodiments, the formation of polymer slug 44 may be based on a previously developed injection plan. For example, a mathematical model may be built that is representative of subterranean reservoir 5 and simulations of the injection of graded polymer slugs of varying properties into the subterranean reservoir may be performed using the mathematical model until an optimized graded polymer slug is determined.

In an embodiment, initially a geological model of the subterranean reservoir 5 (or porous media analogous to the subterranean reservoir 5) is built. The geological model is based on the geology of the reservoir 5 including such parameters as, for example, porosity, permeability, fluid saturation, temperature, salinity, depth, size, hydrocarbon viscosity, etc., of the reservoir 5. The data used to construct the geological model may be obtained from seismic experiments, data obtained from analogous core samples, and/or other sources of data. Following the construction of the geological model, a mathematical model of the subterranean reservoir 5 is built that is based on the geological model.

In some embodiments, the mathematical model comprises a grid model which corresponds to porous media of interest. In some embodiments, the porous media comprises a cylindrical core sample analogous to subterranean reservoir 5. An analogous core sample refers to a core sample (e.g., a sample used for laboratory experimentation) that shares the same geological properties as subterranean reservoir 5. However, in other embodiments, the porous media simulated by the mathematical model may correspond to the subterranean reservoir 5 itself.

The grid model may divide the porous media into a plurality of discrete grids which may be used to numerically simulate phenomena associated with the porous media, including the flowing of a graded polymer slug through the core sample. In some embodiments, in addition to the grid model, the mathematical model includes one or more subgrid models which inherently account for phenomena associated with the porous media that occur at length-scales that are smaller than the grid size of the grid model. For example, the subgrid model may account for immiscible fingering along the front of the simulated polymer slug. The subgrid model may also incorporate miscible fingering along the rear of the simulated polymer slug. Further, the subgrid model may integrate other types of deformations along the front and/or rear of the simulated polymer slug including, for example, heterogeneity and dispersions.

In some embodiments, the subgrid model of the mathematical model includes a two-phase effective fingering model (EFM) for simulating immiscible fingering along the front of the simulated polymer slug. In certain embodiments, the subgrid model includes a Todd-Longstaf model used to account for miscible fingering along the rear of the simulated polymer slug. However, in other embodiments, the subgrid model may comprise other models for simulating the immiscible and/or miscible fingering along the front and rear, respectively, of the simulated polymer slug.

Once the mathematical model of the subterranean reservoir 5 has been built, the displacement of one or more polymer slugs may be simulated using the mathematical model to determine an optimum mobility ratio (M) along the front of the polymer slug that provides the maximum and most rapid recovery of hydrocarbons from subterranean reservoir 5. While generally a lower mobility ratio (M) along the front of the graded polymer slug is preferred, the optimum mobility ratio (M) may vary depending on the geological properties of the subterranean reservoir 5. The subgrid model of the mathematical model may be employed to model immiscible fingering along the front of the simulated polymer slug during the process of determining the optimum mobility ratio (M).

Once the optimum mobility ratio (M) has been determined using the mathematical model, an optimum configuration of the polymer slug may be determined iteratively using both the mathematical model and the optimum mobility ratio (M) and based on the non-linear relationship between polymer concentration and polymer solution viscosity described above. Determining the optimum configuration of the polymer slug may include determining an optimum graded concentration profile or an optimum graded viscosity profile of the polymer slug. In some embodiments, the configuration of the polymer slug tuned using the mathematical model comprises an S-shaped graded viscosity profile which may produce a greater quantify of hydrocarbons from a polymer slug at a given volume or PV relative to other graded polymer slugs of the same PV.

Figure 12:
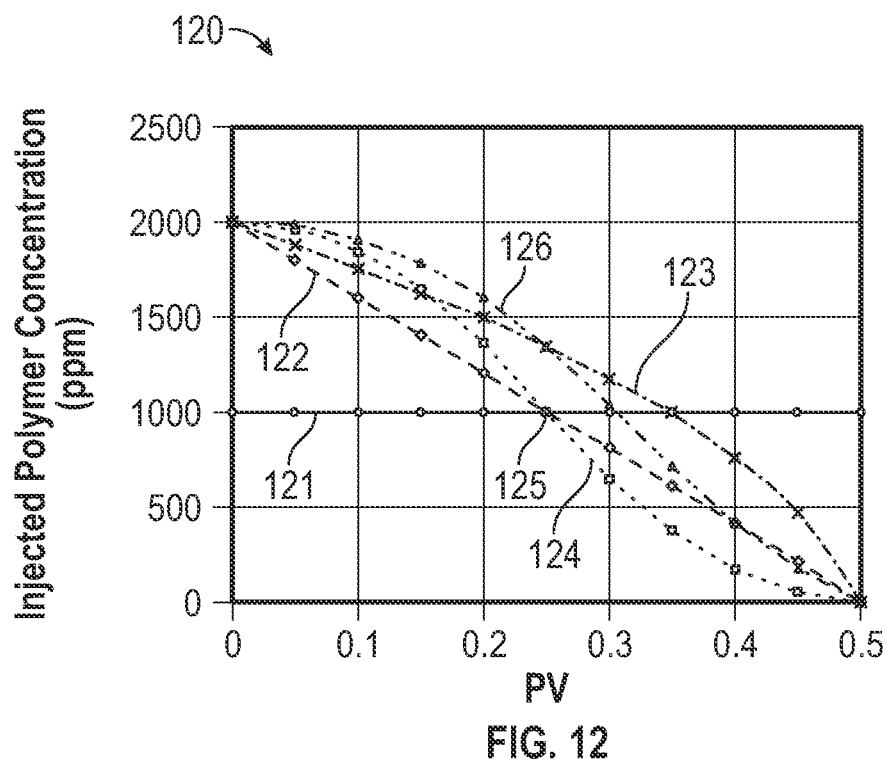
FIG. 12 is a graph illustrating polymer concentration as a function of fractional volume for a plurality of simulated polymer slugs.

For example, referring now to FIG. 12, a graph 120 is shown which indicates injected polymer concentration along a Y-axis thereof as a function of PV along an X-axis thereof for several different polymer slugs. Particularly, graph 120 illustrates a constant concentration slug 121, a linear graded concentration slug 122, a linear graded viscosity slug 123, an S-shaped graded concentration slug 124, and an S-shaped graded viscosity slug 126. As indicated by graph 120, constant concentration slug 121 has a constant polymer concentration along its entire length (extending from 0.0 PV at the front to 0.5 PV at the rear in this example). Linear graded concentration slug 122 has a polymer concentration profile which decreases linearly moving from the front thereof (2,000 ppm in this example) to the rear thereof (0 ppm in this example). Linear graded concentration slug 122 has a viscosity profile which decreases linearly from the front thereof to the rear thereof. Given the non-linear relationship between polymer concentration and polymer solution viscosity, the polymer concentration of linear graded concentration slug 122 does not decrease linearly from the front to the rear thereof. Instead, the polymer concentration profile of linear graded concentration slug 122 forms a convex curve between the front and rear thereof.

The S-shaped graded concentration slug 124 has a polymer concentration profile defined by an S-shape extending between the front and rear thereof. Particularly, the polymer concentration of the front of S-shaped graded concentration slug 124 forms a convex curve while the polymer concentration of the rear of slug 124 forms a convex curve with an inflection point 125 located between the concave and convex curves (1,000 ppm, 0.25 PV in this example) defining the polymer concentration profile of S-shaped graded concentration slug 124. The S-shaped graded viscosity slug 126 has a viscosity profile defined by an S-shape extending between the front and rear thereof. Particularly, the viscosity profile of the front of S-shaped graded viscosity slug 126 forms a convex curve while the viscosity profile of the rear of slug 126 forms a convex curve with an inflection point located between the concave and convex curves. To state in other words, the viscosity of S-shaped graded viscosity slug 126 decreases convexly from the front of slug 126 to an inflection point of slug 126, and concavely from the inflection point to a rear of slug 126, where the concave decrease in viscosity moving away from the inflection point is more rapid than the convex decrease moving away from the front of slug 126. Again, given the non-linear relationship between polymer concentration and polymer solution viscosity, the polymer concentration profile of S-shaped graded viscosity slug 126 deviates from the polymer concentration profile of S-shaped graded concentration slug 124.

Figure 13:
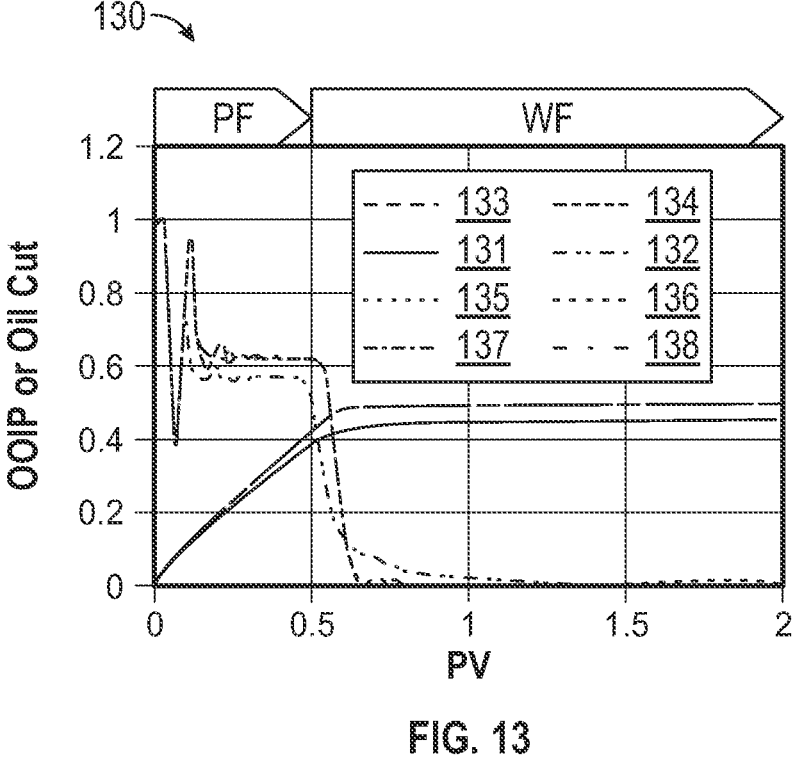
FIG. 13 is a graph illustrating oil recovery and oil cut produced from the simulated polymer slugs of FIG. 12.
Figures 14, 15:
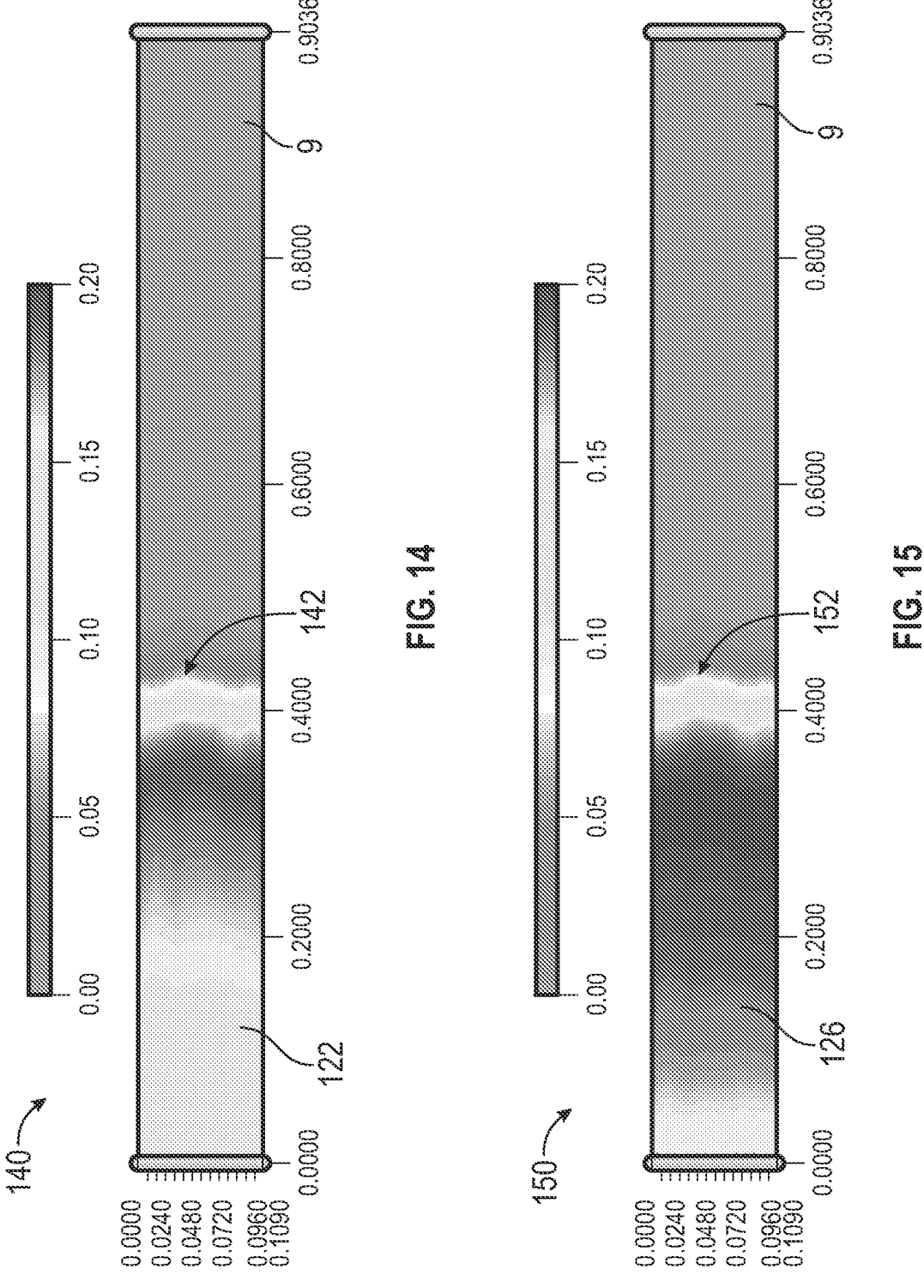
FIG. 14 is a two-dimensional (2D) image illustrating polymer concentration at a given fractional volume of a simulated linear graded concentration polymer slug of FIG. 12.
FIG. 15 is a 2D image illustrating polymer concentration at a given fractional volume of a simulated S-shaped graded viscosity polymer slug of FIG. 12.
Figures 16, 17:
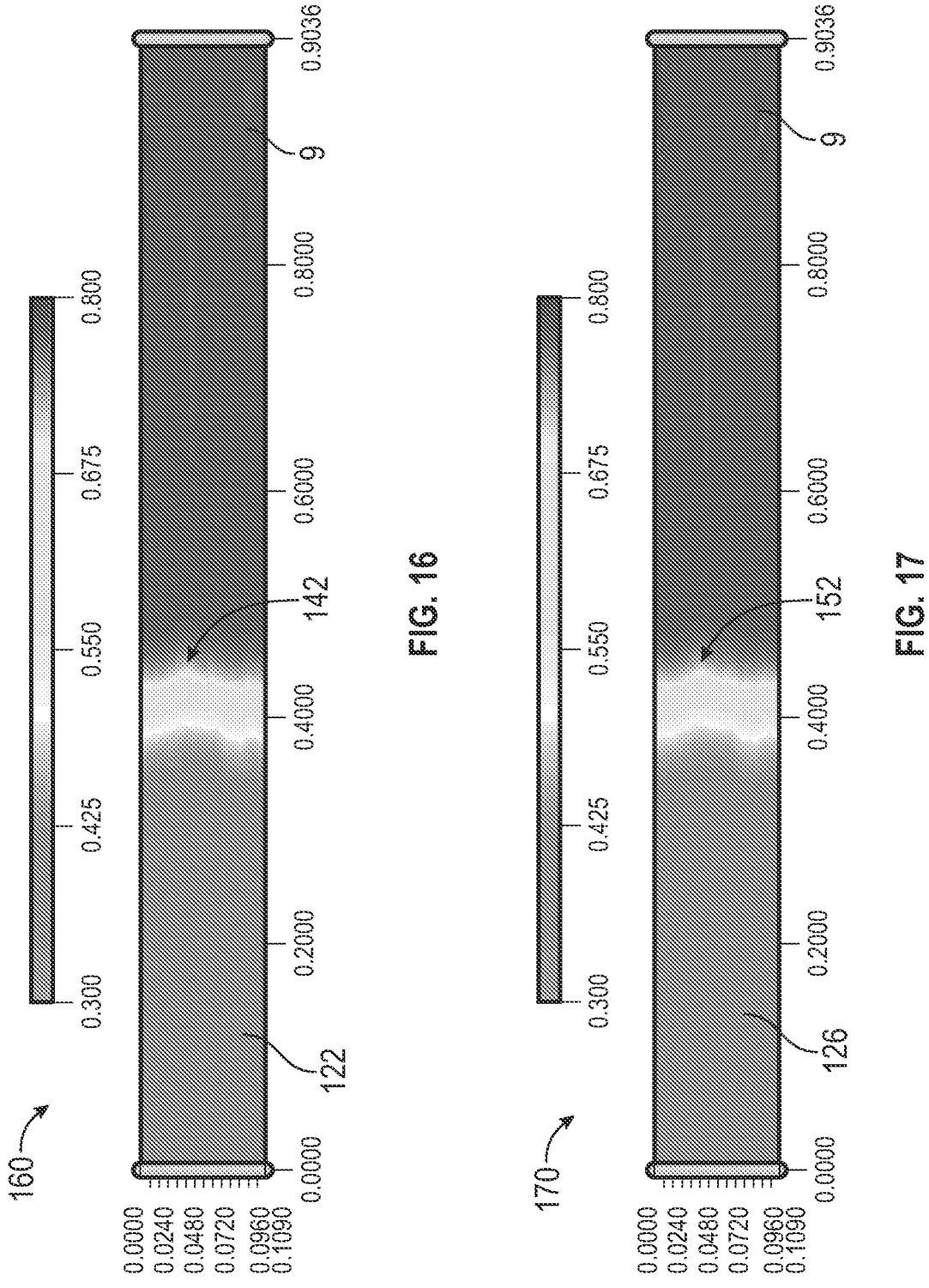
FIG. 16 is a 2D image illustrating oil saturation at a given fractional volume of the simulated linear graded concentration polymer slug of FIG. 12.
FIG. 17 is a 2D image illustrating oil saturation at a given fractional volume of the simulated S-shaped graded viscosity polymer slug of FIG. 12.

Referring to FIGS. 12, 13, a graph 130 is shown in FIG. 13 indicating both original oil in place (OOIP) and oil cut along a Y-axis thereof as a function of PV along an X-axis thereof. Particularly, graph 130 illustrates simulated oil recovery 131 and oil cut 132 for the constant concentration slug 121; simulated oil recovery 133 and oil cut 134 for the linear graded concentration slug 122; simulated oil recovery 135 and oil cut 136 for the S-shaped graded concentration slug 124; and simulated oil recovery 137 and oil cut 138 for the S-shaped graded viscosity slug 126. The simulations are performed in this example using the mathematical model of subterranean reservoir 5 described above with 2,000 ppm taken as the initial polymer concentration configured to produce the optimum mobility ratio (M) along the front of each slug 121, 122, 124, and 126. In this example, the simulated oil recovery 137 of the S-shaped graded viscosity slug 126 is greater than the simulated oil recoveries 131, 133, and 135 of slugs 121, 122, and 124, respectively.

Given the relatively greater performance of a polymer slug having an S-shaped graded viscosity profile, the polymer slug tuned using the mathematical model has such a profile. In determining the optimum configuration of the polymer slug, the mathematical model may be used to define the degree of concavity and convexity of the concave and convex viscosity profile curves which form the viscosity profile of the S-shaped graded viscosity profile. Additionally, the mathematical model may be used to determine an optimum size in PV of the S-shaped graded viscosity slug. Further, in some embodiments, the mathematical model may also simulate the impact on oil recovery from heating the heating fluid before it is injected into subterranean reservoir 5. In this manner, the mathematical model may provide an optimum temperature or temperature profile of the heating fluid to maximize the recovery of hydrocarbons 9 from subterranean reservoir 5.

The mathematical model may also be used to visually depict the front and rear of each simulated polymer slug as it is displaced through the simulated subterranean reservoir 5. For example, referring now to FIGS. 14-17, two-dimensional (2D) images 140, 150, 160, and 170 are shown. 2D images 140, 150 illustrate polymer concentration at 0.24 PV of the linear graded concentration slug 122 and S-shaped graded viscosity slug 126, respectively, while 2D images 160, 170 illustrate hydrocarbon saturation at 0.24 PV of the linear graded concentration slug 122 and S-shaped graded viscosity slug 126, respectively. Each 2D image 140, 150, 160, and 170 illustrates a simulated subterranean reservoir 5 with the X-direction corresponding to the longitudinal direction of reservoir 5 (e.g., the length extending between wells 32, 22) while the Y-direction of each 2D image 140, 150, 160, and 170 corresponds to a width or depth of the simulated reservoir 5.

Particularly, 2D image 140 illustrates a front (indicated by arrow 142) of the linear graded concentration slug 122 where the shading of 2D image 140 correlates with the polymer concentration at the given location of the simulated subterranean reservoir 5. Thus, the shading of the hydrocarbons 9 of the simulated reservoir 5 in 2D image 140 have a different shading than the linear graded concentration slug 122. Additionally, the decrease in polymer concentration moving from the front 142 of the linear graded concentration slug 122 towards the rear thereof is indicated by the change in shading moving towards the left of 2D image 140. 2D image 150 similarly illustrates a front (indicated by arrow 152) of the S-shaped graded viscosity slug 126. 2D images 140, 150 illustrate that the polymer concentration of linear graded concentration slug 122 declines more rapidly moving from the front 142 into the interior thereof compared to S-shaped graded viscosity slug 126.

2D images 160, 170 similarly visually depict simulated subterranean reservoir 5 with 0.24 PV of the linear graded concentration slug 122 injected therein (2D image 160) and with 0.24 PV of the S-shaped graded viscosity slug 126 injected (2D image 170). Particularly, a front 162 of linear graded concentration slug 122 is depicted in 2D image 160 and a front 172 of S-shaped graded viscosity slug 126 is depicted in 2D image 170. However, unlike 2D images 140, 150, the shading of 2D images 160, 170 correlates with oil saturation (the quantity of hydrocarbons compared to water at a given location in the simulated reservoir 5). Thus, the front 142 of linear graded concentration slug 122 may be identified in 2D image 160 based on the change in oil saturation moving from left to right in 2D image 160. Similarly, the front 152 of S-shaped graded viscosity slug 126 may be identified in 2D image 170 based on the change in oil saturation moving from left to right in 2D image 170.

Along with other outputs provided by the mathematical model, using images 140, 150, 160, and 170 the fronts of different simulated polymer slugs may be analyzed in determining the optimum graded polymer slug for a given application. Additionally, while not shown in FIGS. 14-17 the rear of different simulated polymer slugs may also similarly be visually depicted in 2D images (e.g., via varying polymer concentration and/or oil saturation) to assist in the analysis of the development of miscible fingering and other deformations along the rear of each simulated polymer slug.

Once the optimum configuration of the polymer slug has been determined using both the mathematical model and the optimum mobility ratio (M) and based on the non-linear relationship between polymer concentration and polymer solution viscosity, the optimally configured polymer slug may be deployed in the field such as in the manner described above in which polymer slug 44 is formed within the subterranean reservoir 5 to displace hydrocarbons 9 into the production well 22.

Figure 18:
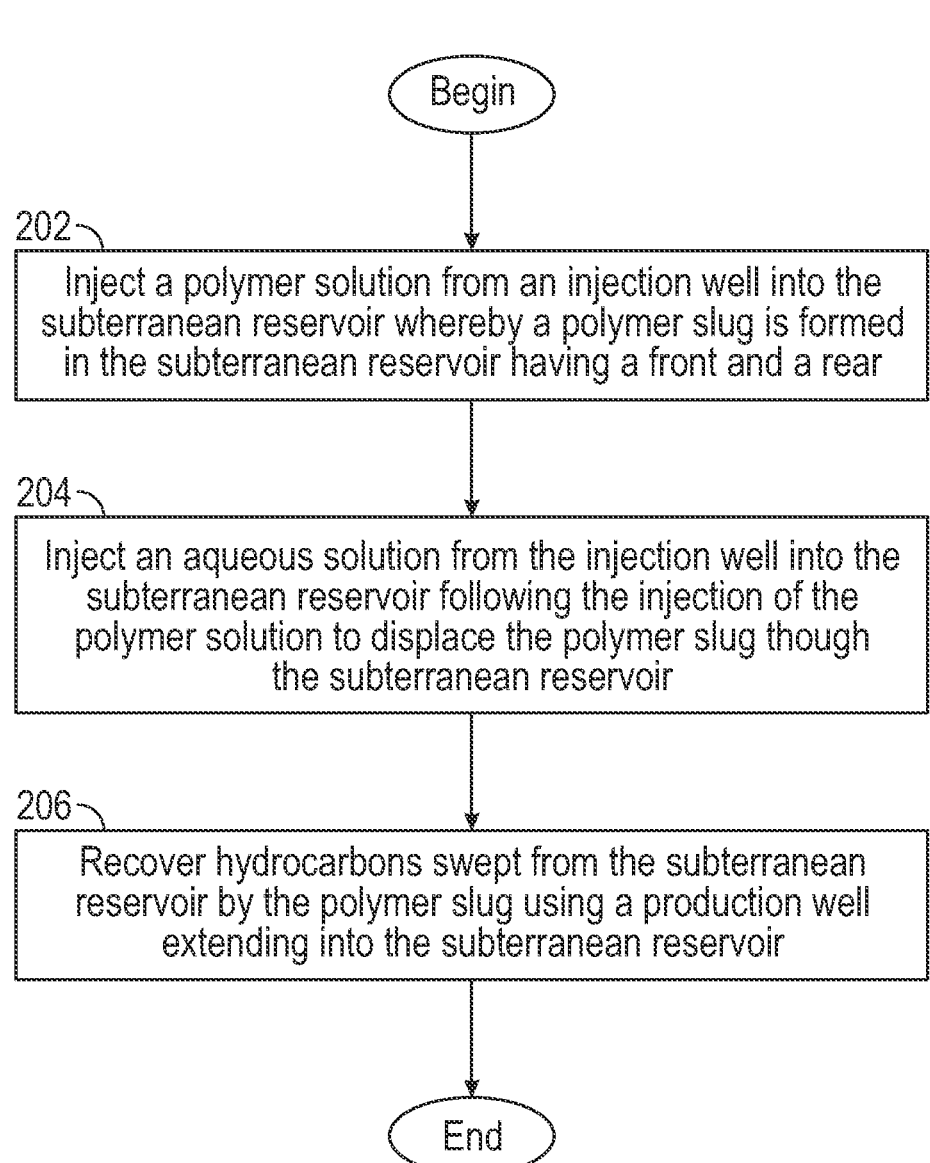
FIG. 18 is a flowchart illustrating an embodiment of a method for performing a polymer flood of a hydrocarbon-bearing, subterranean reservoir in accordance with principles described herein.

Referring to FIG. 18, an embodiment of a method 200 for performing a polymer flood of a hydrocarbon-bearing, subterranean reservoir is shown. Initially, at block 202, method 200 comprises injecting a polymer solution from an injection well into the subterranean reservoir whereby a polymer slug is formed in the subterranean reservoir having a front and a rear. In some embodiments, the polymer slug has an S-shaped graded viscosity profile which decreases convexly in viscosity from the front of the polymer slug to an inflection point and concavely in viscosity from the inflection point to the rear of the polymer slug. In some embodiments, block 202 comprises injecting the polymer solution 42 from the injection well 32 shown in FIGS. 1 and 2 into the subterranean reservoir 5 whereby the polymer slug 44 is formed in the subterranean reservoir 5 having a front 46 and a rear 48. The polymer slug 44 may have an S-shaped graded viscosity profile determined from the nonlinear dependence of the viscosity of the polymer solution on the polymer concentration of the polymer solution may be expressed as indicated by Equations (5) and (6) above.

At block 204, method 200 comprises injecting an aqueous solution from the injection well into the subterranean reservoir following the injection of the polymer solution to displace the polymer slug through the subterranean reservoir. In some embodiments, block 204 comprises injecting the aqueous solution 50 shown in FIG. 1 following the injection of the polymer solution 42 to displace the polymer slug 44 through the subterranean reservoir 5. The aqueous solution 50 may displace the polymer slug 44 into the production well 22 shown in FIGS. 1 and 2. In at least some embodiments, the aqueous solution comprising aqueous solution 50 does not include a polymer. At block 206, method 200 comprises recovering hydrocarbons swept from the subterranean reservoir by the polymer slug using a production well extending into the subterranean reservoir. In some embodiments, block 206 comprises recovering hydrocarbons 9 swept from the subterranean reservoir 5 by the polymer slug 44 shown in FIGS. 1 and 2 using a production well 22 extending into the subterranean reservoir 5. In some embodiments, method 200 may additionally include heating a heating fluid by a surface heating system to a temperature that is greater than the temperature of at least some of the hydrocarbons present in the subterranean reservoir prior to injecting the heating fluid into the subterranean reservoir.

Referring to FIG. 19, another embodiment of a method 220 for performing a polymer flood of a hydrocarbon-bearing, subterranean reservoir is shown. Initially, at block 222, method 220 comprises determining a nonlinear dependence of a viscosity of a polymer solution to a polymer concentration of the polymer solution. In some embodiments, block 222 comprises determining a nonlinear dependence of a viscosity of the polymer solution 42 shown in FIGS. 1 and 2 to a polymer concentration of the polymer solution 42. For example, the nonlinear dependence expressed by one of Equations (4) and (4) shown above. In some embodiments, the nonlinear dependence is determined by initially determining an intrinsic viscosity ($[\eta]$) of a given polymer solution by measuring a dynamic viscosity of the polymer solution at one or more polymer concentrations at a given temperature and at various shear rates to thereby determine a zero-shear viscosity ($\eta_0$) at the one or more polymer concentrations and given temperature and then a specific viscosity at zero shear rate ($\eta_{sp}$) of the polymer solution at the given temperature based on the relationship expressed by Equation (4) above.

At block 224, method 220 comprises simulating the injection of a graded polymer slug into the subterranean reservoir based on the nonlinear dependence of the viscosity of the polymer solution to the polymer concentration of the polymer solution. In some embodiments, block 222 includes developing a geological model of the subterranean reservoir based on geological properties of the reservoir, and developing a mathematical model of the subterranean reservoir based on the geological model. The mathematical model may include a subgrid model as described above and configured to model deformations along a leading front of a simulated graded polymer slug.

At block 226, method 220 comprises determining an optimum configuration of a polymer slug based on the simulation. The optimum configuration may be specific to the particular application and subterranean reservoir in which the polymer slug is to be injected. In some embodiments, block 226 comprises determining an optimum initial polymer concentration of the polymer slug based on the simulation, and determining the optimum configuration of the polymer slug based on the simulation and the optimum initial polymer concentration. In some embodiments, the optimum configuration of the polymer slug includes an S-shaped graded polymer concentration profile which decreases convexly in polymer concentration from a leading front of the polymer slug to an inflection point, and concavely in polymer concentration from the inflection point to a trailing rear of the polymer slug.

At block 228, method 220 comprises injecting a polymer solution to form a polymer slug in the subterranean reservoir having the optimum configuration. In some embodiments, block 228 comprises injecting the polymer solution 42 into the subterranean reservoir whereby the polymer slug 44 is formed in the subterranean reservoir 5 having the optimum configuration.

At block 230, method 220 comprises injecting an aqueous solution from the injection well into the subterranean reservoir following the injection of the polymer solution to displace the polymer slug through the subterranean reservoir. In some embodiments, block 230 comprises injecting the aqueous solution 50 shown in FIG. 1 following the injection of the polymer solution 42 to displace the polymer slug 44 through the subterranean reservoir 5. At block 232, method 220 comprises recovering hydrocarbons swept from the subterranean reservoir by the polymer slug using a production well extending into the subterranean reservoir. In some embodiments, block 232 comprises recovering hydrocarbons 9 swept from the subterranean reservoir 5 by the polymer slug 44 shown in FIGS. 1 and 2 using a production well 22 extending into the subterranean reservoir 5. In some embodiments, method 220 may additionally include heating a heating fluid by a surface heating system to a temperature that is greater than the temperature of at least some of the hydrocarbons present in the subterranean reservoir prior to injecting the heating fluid into the subterranean reservoir.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method for performing a polymer flood of a hydrocarbon-bearing, subterranean reservoir, the method comprising:
   (a) injecting a polymer solution from an injection well into the subterranean reservoir to form a polymer slug in the subterranean reservoir;
   (b) linearly reducing a polymer concentration of the polymer solution over time during (a) beginning with a leading front of the polymer slug and concluding at a trailing rear of the polymer slug to provide the polymer slug with a and a graded viscosity profile which decreases in viscosity from the leading front of the polymer slug to the trailing rear of the polymer slug; and
   (c) injecting an aqueous solution from the injection well into the subterranean reservoir following (a) to displace the polymer slug through the subterranean reservoir.

2. The method of claim 1, wherein the viscosity of the polymer slug at the front thereof is greater than the viscosity of the polymer slug at a midpoint between the front and the rear of the polymer slug.

3. The method of claim 1, wherein a mobility ratio (M) between the front of the polymer slug and hydrocarbons present in the subterranean reservoir is less than or equal to one.

4. The method of claim 1, wherein the graded viscosity profile is S-shaped such that the polymer slug decreases convexly in viscosity from the leading front to an inflection point and concavely in viscosity from the inflection point to the trailing rear, and wherein the inflection point of the polymer slug is located at a midpoint between the front and the rear of the polymer slug.

5. The method of claim 1, wherein the polymer of the polymer solution comprises an acrylamide-based polymer.

6. The method of claim 1, further comprising:
   (d) heating a heating fluid by a surface heating system to a temperature that is greater than the temperature of at least some of the hydrocarbons present in the subterranean reservoir; and
   (e) injecting the heated heating fluid into the subterranean reservoir.

7. The method of claim 1, further comprising:
   (d) determining a nonlinear dependence of the viscosity of the polymer solution to a polymer concentration of the polymer solution, wherein the nonlinear dependence comprises a nonlinear dependence of a specific viscosity at zero shear rate ($\eta_{sp}$) of the polymer solution on the polymer concentration of the polymer solution.

8. The method of claim 1, wherein the polymer slug has a pore volume (PV) equal to at least 0.5 of the subterranean reservoir.

\* \* \* \* \*